United States Patent
Bergström et al.

(10) Patent No.: US 10,149,317 B2
(45) Date of Patent: Dec. 4, 2018

(54) METHODS TO MAP CIF AND SERVING CELLS

(71) Applicant: TELEFONAKTIEBOLAGET LM ERICSSON (PUBL), Stockholm (SE)

(72) Inventors: Mattias Tan Bergström, Stockholm (SE); Marco Belleschi, Solna (SE); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 15/150,779

(22) Filed: May 10, 2016

(65) Prior Publication Data

US 2016/0345353 A1    Nov. 24, 2016

Related U.S. Application Data

(60) Provisional application No. 62/162,052, filed on May 15, 2015.

(51) Int. Cl.
*H04W 72/12* (2009.01)
*H04L 5/00* (2006.01)

(52) U.S. Cl.
CPC ......... *H04W 72/1289* (2013.01); *H04L 5/001* (2013.01); *H04L 5/0053* (2013.01); *H04L 5/0094* (2013.01); *H04W 72/121* (2013.01)

(58) Field of Classification Search
CPC ..... H04L 5/001; H04L 5/0053; H04L 5/0094; H04W 72/042; H04W 72/121; H04W 72/1289
See application file for complete search history.

(56) References Cited

U.S. PATENT DOCUMENTS

| | | | |
|---|---|---|---|
| 2013/0136006 A1 | 5/2013 | Kim et al. | |
| 2014/0153452 A1* | 6/2014 | Son | H04L 5/001 370/280 |
| 2015/0055600 A1 | 2/2015 | Prakash et al. | |
| 2016/0295600 A1* | 10/2016 | Dinan | H04W 72/121 |

FOREIGN PATENT DOCUMENTS

EP    2 849 508 A1    3/2015

* cited by examiner

*Primary Examiner* — Pao Sinkantarakorn

(57) ABSTRACT

A method comprises configuring a wireless device with a plurality of carriers, each of the plurality of carriers comprising a communication channel between the wireless device and one of the network node or another wireless device, and grouping the configured carriers into at least a first group and a second group. The method comprises associating each of the configured carriers of the first group with one of a plurality of possible carrier indicator field values, and associating each of the configured carriers of the second group with one of the plurality of possible carrier indicator field values. The method comprises communicating, to the wireless device on a first carrier of either the first or second groups, information related to a particular carrier in the same group as the first carrier, wherein the particular carrier is identified by its associated carrier indicator field value.

26 Claims, 11 Drawing Sheets

```
SCellToAddMod-r10 ::=      SEQUENCE {
    sCellIndex-r10              SCellIndex-r10,
    cellIdentification-r10      SEQUENCE {
        physCellId-r10              PhysCellId,
        dl-CarrierFreq-r10          ARFCN-ValueEUTRA
    }                                                               OPTIONAL,  -- Cond SCellAdd
    radioResourceConfigCommonSCell-r10   RadioResourceConfigCommonSCell-r10
                                                   OPTIONAL,  -- Cond SCellAdd
    radioResourceConfigDedicatedSCell-r10RadioResourceConfigDedicatedSCell-r10
                                                   OPTIONAL,  -- Cond SCellAdd
    ...,
    [[ dl-CarrierFreq-v1090         ARFCN-ValueEUTRA-v9e0 OPTIONAL    -- Cond
EARFCN-max
    ]]
→   cif-Index-r13               INTEGER(0..7)        OPTIONAL    -- Need ON
}
```

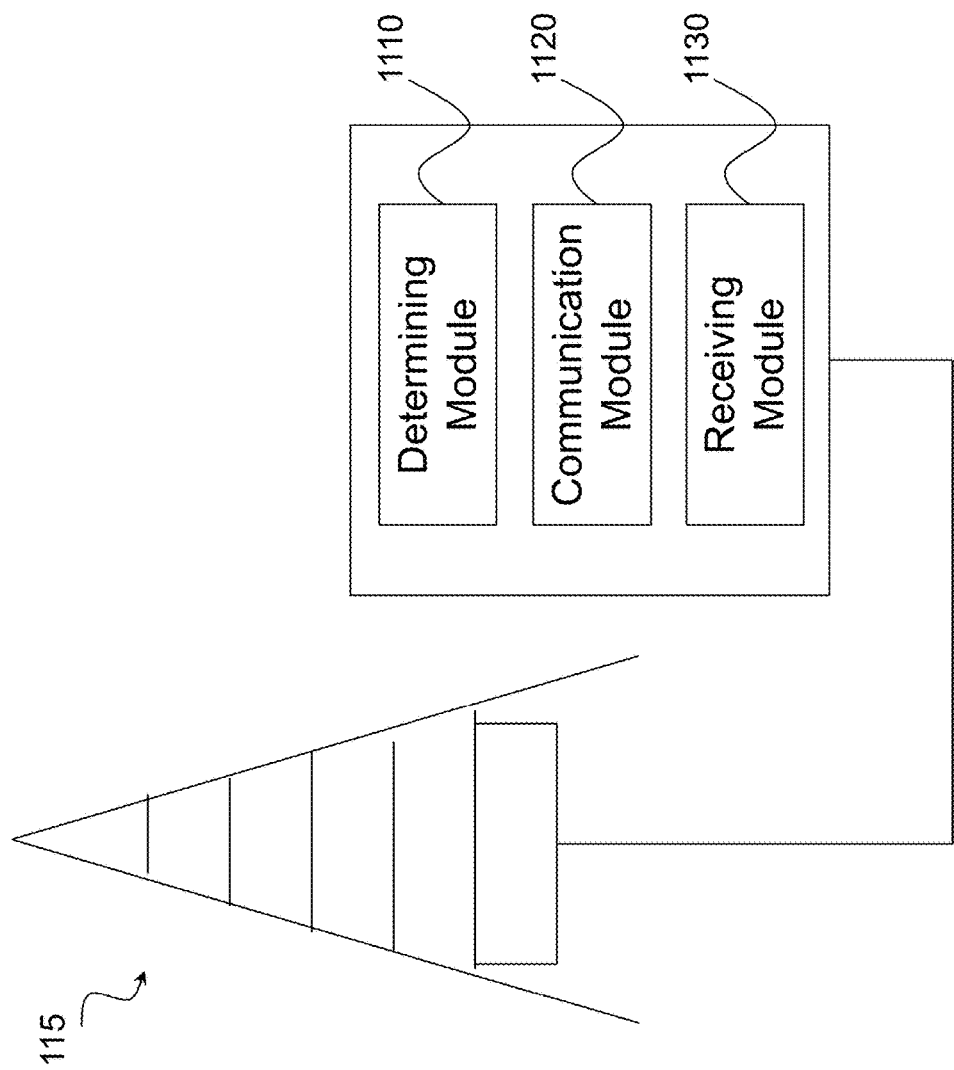

METHODS TO MAP CIF AND SERVING CELLS

PRIORITY

This application claims the benefit under 35 U.S.C. § 119(e) of the priority of U.S. Provisional Application 62/162,052 filed on May 15, 2015, entitled "Methods to Map CIF and Serving Cells," the entire disclosure of which is hereby incorporated by reference.

TECHNICAL FIELD

The present disclosure relates, in general, to wireless communications and, more particularly, to methods to map carrier indicator fields and serving cells.

BACKGROUND

Carrier aggregation (CA) was initially introduced in Release 10 to increase the available bandwidth and hence the achievable data rate in a Long Term Evolution (LTE) system up to 1 Gbps in downlink (DL) and 500 Mbps in uplink (UL). This is accomplished by aggregating multiple component carriers (CCs) that can be jointly used for UL and/or DL transmissions both in Frequency Division Duplex (FDD) and Time Division Duplex (TDD) configurations. In particular, LTE CA considers the possibility to aggregate up to 5 CCs potentially of different bandwidths (e.g., 1.4 MHz, 3 MHz, 5 MHz, 10 MHz, 15 MHz, 20 MHz), thus pushing the maximum aggregated bandwidth to 100 MHz. A key feature of CA is that the aggregation can take place across CCs that are not necessarily contiguous in frequency at the expense of additional user equipment (UE) complexity. As such, operators possessing a fragmented spectrum can still boost the achievable data rate even though they are not provided with a large enough single wideband carrier.

The introduction of CA has the side effect of increasing UE battery power consumption because a UE needs to monitor in parallel multiple DL carriers and also multiplex transmissions over multiple UL carriers. This problem may become even more severe in cases of inter-band carrier aggregation where CCs are not located within the same operating frequency band, and the UE is required to execute multiple receiver/transmitter chains simultaneously. For this reason, CA is typically activated/deactivated by the network on a UE basis in a dynamic fashion according to some specific rules, such as the DL/UL traffic demands, the channel quality, or some load balancing policies that force the UE to move to some specific carriers.

More specifically, a CA-capable UE can be provided with a primary carrier (PCell) and one or more secondary carriers (SCell), where each carrier looks like a cell with its own physical identity. According to 3GPP, some operations are supposed to be handled only by the PCell (e.g., the Physical Uplink Control Channel (PUCCH) Uplink Control Information (UCI) transmissions, the Contention Based Random Access (CBRA), the Radio Resource Control (RRC) signaling, and the Non-Access Stratum (NAS) information). The selection of PCell and SCell(s) is also UE specific, and similar strategies previously described can be adopted to select the PCell and the SCell(s).

An extension of legacy CA functionality is currently under standardization in 3GPP Release 13. The objective of this enhancement is to increase the amount of supported CCs up to 32 to give additional flexibility to the CA settings. For example, one possible setup could be to combine this new feature with a License Assisted Access (LAA) framework, thereby providing the possibility to aggregate unlicensed CCs (e.g., Wi-Fi bands) together with licensed carriers for a maximum number of 32 aggregated CCs.

FIG. 1 illustrates an example of cross-carrier scheduling. Cross-carrier scheduling is one important feature of CA. It is possible with cross-carrier scheduling to send DL scheduling assignments and UL scheduling grants on Physical Downlink Control Channel (PDCCH) from a different CC than the one actually scheduled. FIG. 1 illustrates a number of CCs, including PCell 5, SCell1 10, and SCell2 15. Each CC carrier includes a PDCCH portion 20 and a data portion 25. As shown in the example of FIG. 1, PDCCH portion 20 of PCell 5 includes DL scheduling assignments and/or UL scheduling grants for SCell1 10 and SCell2 15 (indicated by arrows 30 and 35, respectively). As such, PDSCH and PUSCH can be sent on a CC other than the one on which the related PDCCH has been received. This is in contrast to the scenario without cross-carrier scheduling (illustrated by arrow 40). Different benefits can be envisaged for this feature. As one example, cross-carrier scheduling may allow balancing of the inter-cell interference caused by the PDCCH. As another example, cross-carrier scheduling may be used for load balancing purposes (especially taking into account that the size and the bandwidth of the different deployed carriers can be significantly different).

The cross-carrier scheduling mechanism can be enabled/disabled independently for each CC via RRC signaling. The cross-carrier scheduling mechanism leverages a 3-bit Carrier Indicator Field (CIF) carried by a PDCCH. This CIF indicates to which carrier a certain DL scheduling assignment or UL scheduling grant refers. A CIF having a size of 3 bits can take on 8 different values. Thus, with the 3-bit CIF, a maximum of 8 carriers can be cross-carrier scheduled. In addition to indicating which carrier a certain DL scheduling assignment or UL scheduling grant refers, the CIF can also be used in other scenarios. For example, the CIF can be used for PDCCH order to order a UE to perform Contention Free Random Access (CFRA) on a particular carrier.

As described above, the 3-bit CIF can be used in PDCCH for cross-carrier scheduling. With the current CIF size, it is not possible to address more than 8 carriers. Before 3GPP Release 13, this limitation was not a problem since no more than 5 carriers can be aggregated. In 3GPP Release 13, however, the amount of carriers that can be aggregated will increase to 32. The 3-bit size of CIF therefore limits the cross-carrier scheduling capability in 3GPP Release 13. Similar limitations hold for other cases in which CIF is used, such as in the case of PDCCH ordering described above.

One possible approach to the problem posed by increasing the number of carriers that can be aggregated is to increase the length of the CIF to 5 bits in order to accommodate all of the 32 possible carriers. Such an approach, however, has the side effect of increasing the PDCCH size and implies resource wastage in case not all the 32 carriers are configured. Furthermore, there is the issue of whether there is a need to support the case where all 32 CCs are scheduled by a single CC. In addition, the DL control channel capacity limitation and (E)PDCCH/PHICH blocking/collision needs to be resolved if this is deemed to be supported.

Based at least in part on these reasons, 3GPP has agreed to not change the size of the CIF and to keep using the 3-bit CIF in Release 13. Thus, there is a need for new mechanisms that can allow cross-carrier scheduling of more than 8 carriers without changing the size of the CIF.

SUMMARY

To address the foregoing problems with existing approaches, disclosed is a method in a network node. The method comprises configuring a wireless device with a plurality of carriers, each of the plurality of carriers comprising a communication channel between the wireless device and one of the network node or another wireless device. The method comprises grouping the configured carriers into at least a first group and a second group. The method comprises associating each of the configured carriers of the first group with one of a plurality of possible carrier indicator field values such that each of the configured carriers of the first group has a different carrier indicator field value than other configured carriers in the first group, and associating each of the configured carriers of the second group with one of the plurality of possible carrier indicator field values such that each of the configured carriers of the second group has a different carrier indicator field value than other configured carriers in the second group. The method comprises communicating, to the wireless device on a first carrier of either the first or second groups, information related to a particular carrier in the same group as the first carrier, wherein the particular carrier is identified by its associated carrier indicator field value.

In certain embodiments, the information may comprise one or more of: a downlink scheduling assignment for the particular carrier; an uplink scheduling grant for the particular carrier; a sidelink grant for the particular carrier; and an order to perform contention free random access on the particular carrier.

In certain embodiments, the method may comprise communicating, to the wireless device, the carrier indicator field value associated with each of the configured carriers of the first and second groups. The carrier indicator field value associated with each of the configured carriers of the first and second groups may be communicated via radio resource control signaling. In certain embodiments, the method may comprise communicating, to the wireless device, information indicating which of the configured carriers belong to the first group and which of the configured carriers belong to the second group, the communicated information further comprising the carrier indicator field value associated with each of the configured carriers of the first and second groups.

In certain embodiments, the method may comprise associating each of the configured carriers of the first group with one of a plurality of possible cell index values, and associating each of the configured carriers of the second group with one of the plurality of possible cell index values. The method may comprise configuring the wireless device to identify a carrier indicator field value for the particular carrier based on the cell index value of the particular carrier. In certain embodiments, at least one of the configured carriers may be associated with a particular one of the plurality of possible carrier indicator field values based on one or more characteristics of the at least one carrier. The one or more characteristics may comprise one or more of: whether the at least one carrier is configured with a physical uplink control channel; and whether the at least one carrier is a scheduling cell.

Also disclosed is a network node. The network node comprises one or more processors. The one or more processors are configured to configure a wireless device with a plurality of carriers, each of the plurality of carriers comprising a communication channel between the wireless device and one of the network node or another wireless device, and group the configured carriers into at least a first group and a second group. The one or more processors are configured to associate each of the configured carriers of the first group with one of a plurality of possible carrier indicator field values such that each of the configured carriers of the first group has a different carrier indicator field value than other configured carriers in the first group, and to associate each of the configured carriers of the second group with one of the plurality of possible carrier indicator field values such that each of the configured carriers of the second group has a different carrier indicator field value than other configured carriers in the second group. The one or more processors are configured to communicate, to the wireless device on a first carrier of either the first or second groups, information related to a particular carrier in the same group as the first carrier, wherein the particular carrier is identified by its associated carrier indicator field value.

Also disclosed is a method in a wireless device. The method comprises receiving, from a network node on a first carrier of either a first group of configured carriers or a second group of configured carriers, information related to a particular carrier in the same group as the first carrier, wherein the wireless device is configured with a plurality of carriers, each of the plurality of carriers comprising a communication channel between the wireless device and one of the network node or another wireless device, and the particular carrier is associated with one of a plurality of possible carrier indicator field values. The method comprises determining, based on the first carrier on which the information was received, whether the first carrier belongs to the first group of configured carriers or the second group of configured carriers. The method comprises identifying, based on the determined group that the first carrier belongs to and the carrier indicator field value associated with the particular carrier, one of the plurality of configured carriers as the particular carrier.

In certain embodiments, the information may comprise one or more of: a downlink scheduling assignment for the particular carrier; an uplink scheduling grant for the particular carrier; a sidelink grant for the particular carrier; and an order to perform contention free random access on the particular carrier.

In certain embodiments, the method may comprise receiving, from the network node, information indicating which one of a plurality of possible carrier indicator field values is associated with each of the configured carriers of the first and second groups, and identifying one of the plurality of carriers as the particular carrier may be based on the received information. The carrier indicator field value associated with each of the configured carriers of the first and second groups may be received via radio resource control signaling. In certain embodiments, the method may comprise receiving, from the network node, information indicating which of the plurality of configured carriers belong to the first group and which of the configured carriers belong to the second group, the received information further comprising the carrier indicator field value associated with each of the configured carriers of the first and second groups. Identifying one of the plurality of carriers as the particular carrier may be based on the received information.

In certain embodiments, each of the configured carriers of the first and second groups may be associated with one of a plurality of possible cell index values, and the method may comprise associating each carrier of the first and second groups with one of a plurality of possible carrier indicator field values based on the cell index value associated with each carrier, and identifying one of the plurality of configured carriers as the particular carrier may be based on the cell indicator field value associated with each carrier based on the cell index value. In certain embodiments, associating each carrier of the first and second groups with one of the plurality of possible carrier indicator field values based on the cell index value associated with each carrier may comprise associating a carrier having a lowest numerical cell index value of each of the first and second groups with a lowest numerical carrier indicator field value, and associating additional carriers of each of the first and second groups with one of the plurality of possible cell indicator field values such that each additional carrier having a next lowest numerical cell index value is associated with a next lowest numerical carrier indicator field value. In certain embodiments, associating each carrier of the first and second groups with one of the plurality of possible carrier indicator field values based on the cell index value associated with each carrier may comprise associating a carrier having a highest numerical cell index value of each of the first and second groups with a lowest numerical carrier indicator field value, and associating additional carriers of each of the first and second groups with one of the plurality of possible cell indicator field values such that each additional carrier having a next highest numerical cell index value is associated with a next lowest numerical carrier indicator field value.

Also disclosed is a wireless device. The wireless device comprises one or more processors. The one or more processors are configured to receive, from a network node on a first carrier of either a first group of configured carriers or a second group of configured carriers, information related to a particular carrier in the same group as the first carrier, wherein the wireless device is configured with a plurality of carriers, each of the plurality of carriers comprising a communication channel between the wireless device and one of the network node or another wireless device, and the particular carrier is associated with one of a plurality of possible carrier indicator field values. The one or more processors are configured to determine, based on the first carrier on which the information was received, whether the first carrier belongs to the first group of configured carriers or the second group of configured carriers. The one or more processors are configured to identify, based on the determined group that the first carrier belongs to and the carrier indicator field value associated with the particular carrier, one of the plurality of configured carriers as the particular carrier.

Certain embodiments of the present disclosure may provide one or more technical advantages. As one example, certain embodiments may advantageously enable cross-carrier scheduling or other operations involving transfer of carrier indicator field values to a wireless device to be performed on more than 8 serving cells while still relying on the existing 3-bit carrier indicator field size. As another example, even keeping the legacy carrier indicator field size, the various embodiments may advantageously enable cross-carrier scheduling flexibility to be fully exploited over all the 32 carriers that can be configured. As still another example, in addition to cross-carrier scheduling, similar benefits may be achieved for other scenarios in which carrier indicator field values need to be transferred to a wireless device, such as for Physical Downlink Control Channel order, which also uses the carrier indicator field to order the wireless device to perform contention free random access on a particular carrier. As yet another example, in certain embodiments an implicit mapping may be employed that may advantageously result in reduced signaling overhead as the network node does not need to explicitly communicate a mapping indicator. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 3 illustrates one way of implementing explicit mapping using radio resource control signaling, in accordance with certain embodiments;

FIG. 11 is a block schematic of an exemplary network node, in accordance with certain embodiments.

DETAILED DESCRIPTION

Figure 1:
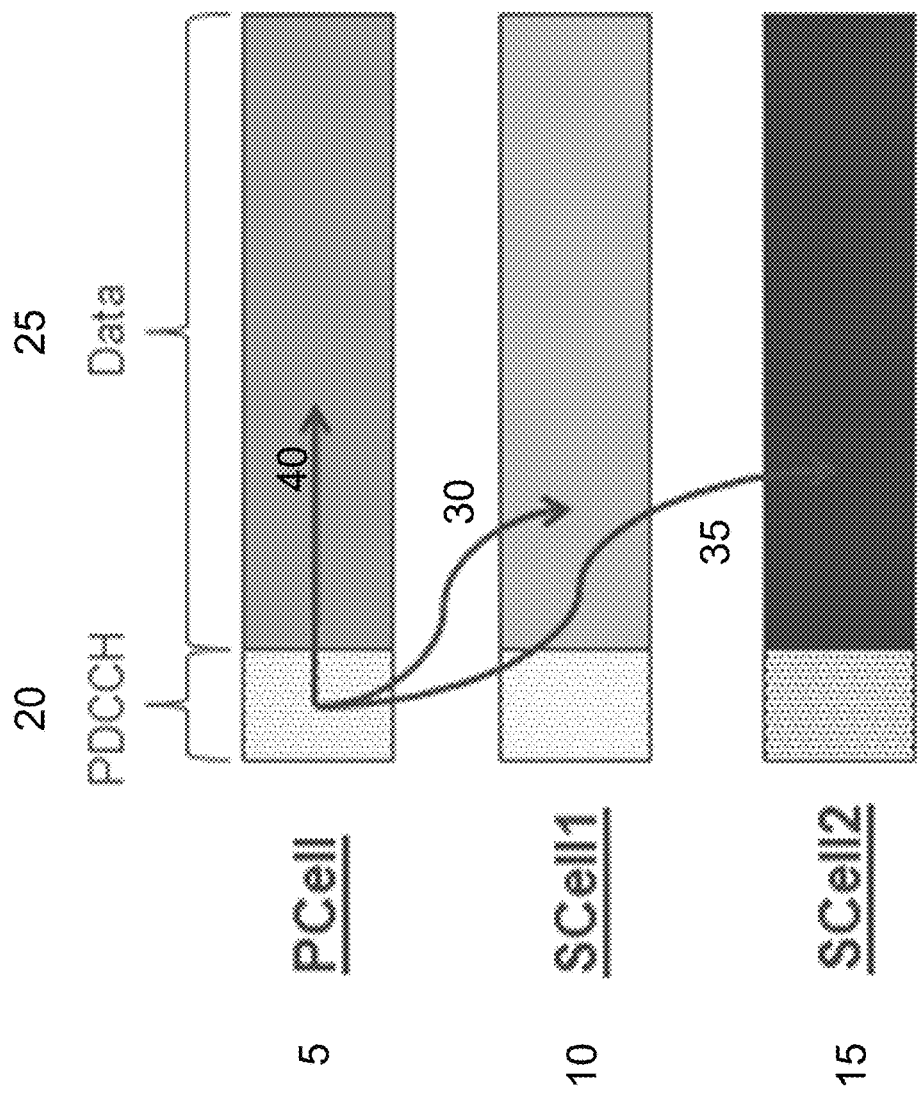
FIG. 1 illustrates an example of cross-carrier scheduling.

As described above, the CIF may be used in PDCCH for cross-carrier scheduling. With the current CIF size of 3 bits, however, it is not possible to address more than 8 carriers. This will limit the cross-carrier scheduling capability once the amount of carriers that can be aggregated increases to 32 in 3GPP Release 13. 3GPP has agreed to not change the size of the CIF, at least in part because increasing the size of the CIF to 5 bits in order to accommodate all of the 32 possible carriers will increase the PDCCH size and result in resource wastage if not all of the 32 possible carriers are configured. The present disclosure contemplates various embodiments that may address these and other deficiencies associated with existing approaches. The various embodiments may advantageously enable mapping of CIF to serving cells when more than 8 serving cells are configured for the UE, while still relying on the existing 3-bit CIF size.

For example, in certain embodiments a method in a network node is disclosed. The network node configures a wireless device with a plurality of carriers, each of the plurality of carriers comprising a communication channel between the wireless device and one of the network node or another wireless device. The network node groups the configured carriers into at least a first group and a second group. The network node associates each of the configured carriers of the first group with one of a plurality of possible CIF values such that each of the configured carriers of the first group has a different CIF value than other configured carriers in the first group. The network node associates each of the configured carriers of the second group with one of the plurality of possible CIF values such that each of the configured carriers of the second group has a different CIF value than other configured carriers in the second group. The network node communicates, to the wireless device on a first carrier of either the first or second groups, information related to a particular carrier in the same group as the first carrier, wherein the particular carrier is identified by its associated CIF value. In some cases, the particular carrier may be different from the first carrier. In some cases, the particular carrier may be the same as the first carrier. In certain embodiments, the information may be one or more of: a downlink scheduling assignment for the particular carrier; an uplink scheduling grant for the particular carrier; a sidelink grant for the particular carrier; and an order to perform CFRA on the particular carrier.

As another example, in certain embodiments a method in a wireless device is disclosed. The wireless device receives, from a network node on a first carrier of either a first group of configured carriers or a second group of configured carriers, information related to a particular carrier in the same group as the first carrier. The wireless device is configured with a plurality of carriers, each of the plurality of carriers comprising a communication channel between the wireless device and one of the network node or another wireless device. The particular carrier is associated with one of a plurality of possible CIF values. In some cases, the particular carrier may be different from the first carrier. In some cases, the particular carrier may be the same as the first carrier. The wireless device determines, based on the first carrier on which the information was received, whether the first carrier belongs to the first group of configured carriers or the second group of configured carriers. The wireless device identifies, based on the determined group that the first carrier belongs to and the CIF value associated with the particular carrier, one of the plurality of configured carriers as the particular carrier.

The various embodiments described herein may advantageously enable cross-carrier scheduling or other operations involving transfer of CIF values to a wireless device to be performed on more than 8 serving cells while still relying on the existing 3-bit CIF size. Thus, even keeping the legacy CIF size, it will be possible to fully exploit the cross-carrier scheduling flexibility over all the 32 carriers that can be configured. As described in more detail below, similar benefits may also be achieved for any scenarios in which CIF values needs to be transferred to the wireless device, such as for PDCCH order, which also uses CIF to order the wireless device to perform CFRA on a particular carrier.

Figure 2:
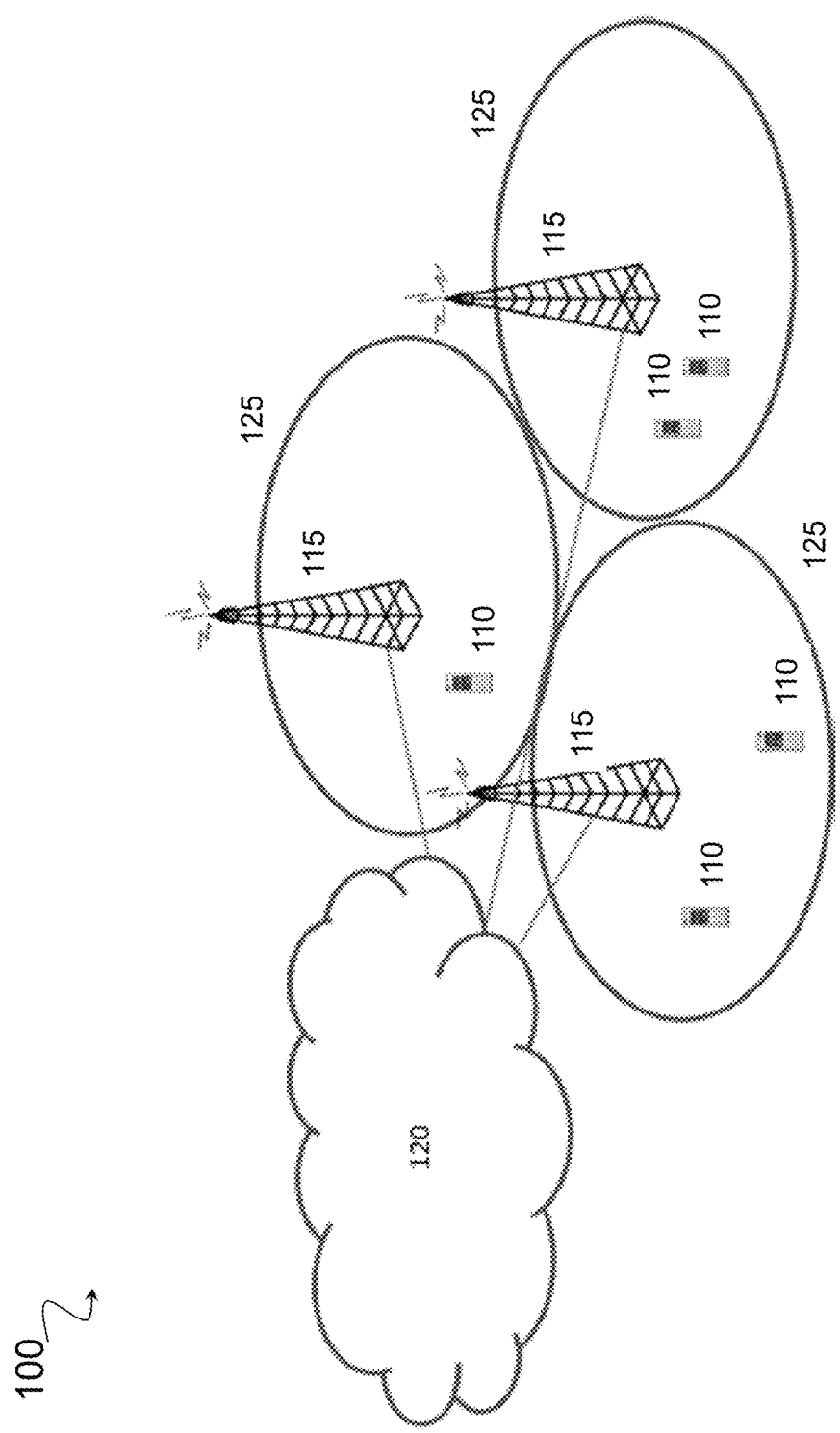
FIG. 2 illustrates an example embodiment of a wireless communications network, in accordance with certain embodiments.

FIG. 2 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNodeBs (eNBs) 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 7-11.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

As described above, the various embodiments described herein relate to methods for establishing a mapping between carrier/cell indicator fields (referred to herein as Carrier Indicator Fields (CIF)) and carriers in, for example, a scenario when wireless device 110 is configured with cross-carrier scheduling groups. Although certain embodiments may be described using cross-carrier scheduling as an example (in which the CIF indicates the carriers scheduled), the present disclosure contemplates that the various embodiments are not limited to such an example and are applicable to a variety of scenarios, including any scenario in which CIF values need to be transferred to wireless device 110, including, for example, PDCCH order (which also uses CIF to order wireless device 110 to perform CFRA on a particular carrier).

As used herein, the terms carrier, cell, serving cell, and component carrier may be used interchangeably to refer to a communication channel between two entities, such as a network node and a wireless device, in which the two entities can communicate with each other. Furthermore, even though LTE is used herein as one example, it should be appreciated that this is just an example and the various embodiments may be applied to other types of systems where cross-carrier scheduling or similar mechanisms are applied.

As described above, network node 115 configures wireless device 110 with a plurality of carriers, each of the plurality of carriers comprising a communication channel between wireless device 110 and one of network node 115 or another wireless device 110. In certain embodiments, each of the configured carriers is associated with a cell index value. Network node 115 groups the configured carriers into at least a first group and a second group. In certain embodiments, the first and second groups may be cross-carrier scheduling groups.

Network node 115 associates each of the configured carriers of the first group with one of a plurality of possible CIF values such that each of the configured carriers of the first group has a different CIF value than other configured carriers in the first group. Network node 115 associates each of the configured carriers of the second group with one of the plurality of possible CIF values such that each of the configured carriers of the second group has a different CIF value than other configured carriers in the second group. Network node 115 communicates, to wireless device 110 on a first carrier of either the first or second groups, information related to a particular carrier in the same group as the first carrier. In some cases, the particular carrier may be different from the first carrier. In some cases, the particular carrier may be the same as the first carrier. The particular carrier is identified by its associated CIF value. The information related to the particular carrier may be any suitable information. For example, the information may be one or more of a DL scheduling assignment for the particular carrier; an UL scheduling grant for the particular carrier; a sidelink grant for the particular carrier; an order to perform contention free random access on the particular carrier; and any other suitable information.

In certain embodiments, wireless device 110 receives, from network node 115 on the first carrier of either the first group of configured carriers or the second group of configured carriers, the information related to the particular carrier. The particular carrier is associated with one of a plurality of possible CIF values. Wireless device 110 determines, based on the first carrier on which the information was received, whether the first carrier belongs to the first group of configured carriers or the second group of configured carriers. Wireless device 110 identifies, based on the determined group that the first carrier belongs to and the CIF value associated with the particular carrier, one of the plurality of configured carriers as the particular carrier.

In order to identify the particular carrier, wireless device 110 needs to be aware of the mapping of CIF values to the configured carriers of the first group and the configured carriers of the second group. The mapping between carriers and CIF values may be established in any suitable manner. As one example, in certain embodiments the mapping between carriers and CIF values may be explicitly configured by the network (e.g., configured by a network node, such as network node 115). As another example, in certain embodiments the mapping between carriers and CIF values may be implicit.

In cases where explicit mapping is used, the mapping between carriers and CIF values is explicitly configured by the network. For example, network node 115, which may be any suitable network node (such as an eNB in LTE), may explicitly configure the mapping between carriers and CIF values. In some cases, network node 115 can indicate for each carrier which CIF value a cell is associated with. As one example, network node 115 may communicate, to wireless device 110, the CIF value associated with each of the configured carriers of the first and second groups. Wireless device 110 may identify one of the plurality of carriers as the particular carrier based on the received information.

As another example, network node 115 may communicate the mapping by indicating a set of cross-carrier scheduling groups to wireless device 110 and, for each group, which serving cells are mapped to this group together with the CIF value to which each of those serving cells are mapped. For example, network node 115 may communicate, to wireless device 110, information indicating which of the configured carriers belong to the first group and which of the configured carriers belong to the second group. The communicated information may further comprise the CIF value associated with each of the configured carriers of the first and second groups. Wireless device 110 may identify one of the plurality of carriers as the particular carrier based on the received information.

In certain embodiments, the mapping between CIF values and configured carriers may be implicit. Wireless device 110 may determine that an implicit mapping is being used in any suitable manner. For example, in certain embodiments if network node 115 excludes the mapping indicator then wireless device 110 may implicitly assume a mapping for this cell. Implicit mapping has the benefit that no additional signaling is needed to establish the mapping. This may advantageously allow for reduced signaling overhead as network node 115 does not need to explicitly communicate the mapping indicator if an implicit mapping is acceptable.

In embodiments in which the mapping between carriers and CIF values is implicit, the mapping may be performed in any suitable manner. As described above, network node 115 may associate each of the configured carriers of the first group with one of a plurality of possible cell index values, and associate each of the configured carriers of the second group with one of the plurality of possible cell index values. In cases where implicit mapping is used, wireless device 110 can associate each carrier of the first and second groups with one of a plurality of possible CIF values based on the cell index value associated with each carrier. Wireless device 110 can then identify one of the plurality of configured carriers as the particular carrier to which the received information (e.g., a DL scheduling assignment) relates to using the CIF value associated with each carrier based on the cell index value. In certain embodiments, the implicit mapping performed by wireless device 110 may be based on one or more predefined rules.

As one example, in certain embodiments the CIF values can be mapped to the configured carriers such that the carrier with the lowest cell index value in a group is mapped to the lowest CIF value and the carrier with the second lowest cell index value in the group is mapped to the second lowest CIF value, and so on. In such a case, wireless device 110 may associate a carrier having a lowest numerical cell index value of each of the first and second groups with a lowest numerical CIF value, and associate additional carriers of each of the first and second groups with one of the plurality of possible CIF values such that each additional carrier having a next lowest numerical cell index value is associated with a next lowest numerical CIF value. To illustrate this example embodiment, assume wireless device 110 is configured with a first group of carriers, Group 1, and a second group of carriers, Group 2. Assume further that Group 1 includes Carrier 1 (with a cell index value of 1), Carrier 3 (with a cell index value of 3) and Carrier 4 (with a cell index value of 4), and that Group 2 includes Carrier 2 (with a cell index value of 2) and Carrier 17 (with a cell index value of 17). In this example embodiment, wireless device 110 would associate Carrier 1 (i.e., the carrier in Group 1 having the lowest numerical cell index value) with CIF 0, Carrier 3 (i.e., the carrier in Group 1 having the next lowest numerical cell index value) with CIF 1, and Carrier 4 (i.e., the carrier in Group 1 having the next lowest numerical cell index value) with CIF 2. Wireless device 110 would associate Carrier 2 (i.e., the carrier in Group 2 having the lowest numerical cell index value) with CIF 0, and Carrier 17 (i.e., the carrier in Group 2 having the next lowest numerical cell index value) with CIF 1.

As another example, in certain embodiments the CIF values can be mapped such that the carrier with the highest cell index value in a group is mapped to the lowest CIF value and the carrier with the second highest cell index value in the group is mapped to the second lowest CIF value, and so on. In such a case, wireless device 110 may associate a carrier having a highest numerical cell index value of each of the first and second groups with a lowest numerical CIF value, and associate additional carriers of each of the first and second groups with one of the plurality of possible CIF values such that each additional carrier having a next highest numerical cell index value is associated with a next lowest numerical CIF value. To illustrate this example embodiment, assume wireless device 110 is configured with a first group of carriers, Group 1, and a second group of carriers, Group 2. Assume further that Group 1 includes Carrier 1 (with a cell index value of 1), Carrier 3 (with a cell index value of 3) and Carrier 4 (with a cell index value of 4), and that Group 2 includes Carrier 2 (with a cell index value of 2) and Carrier 17 (with a cell index value of 17). In this example embodiment, wireless device 110 would associate Carrier 4 (i.e., the carrier in Group 1 having the highest numerical cell index value) with CIF 0, Carrier 3 (i.e., the carrier in Group 1 having the next highest numerical cell index value) with CIF 1, and Carrier 1 (i.e., the carrier in Group 1 having the next highest numerical cell index value) with CIF 2. Wireless device 110 would associate Carrier 17 (i.e., the carrier in Group 2 having the highest numerical cell index value) with CIF 0, and Carrier 2 (i.e., the carrier in Group 2 having the next highest numerical cell index value) with CIF 1.

In some cases, a variant of the implicit mapping may be used in which a certain cell has a fixed mapping. In certain embodiments, at least one of the configured carriers may be associated with a particular one of the plurality of possible CIF values based on one or more characteristics of the at least one carrier. The at least one carrier may be associated with a particular one of the plurality of possible CIF values based on any suitable characteristics. As one non-limiting example, the at least one carrier may be associated with a particular one of the plurality of possible CIF values based on whether the cell is configured with PUCCH. In such a case, a cell that is configured with PUCCH may be assigned a fixed mapping. For example, if there is a cell within a cross-carrier scheduling group that has PUCCH configured then this cell may be implicitly associated with CIF 0. As another non-limiting example, the at least one carrier may be associated with a particular one of the plurality of possible CIF values based on whether the cell is a scheduling cell. For example, a scheduling cell may be implicitly associated with CIF 0.

Whether wireless device 110 applies an implicit mapping or an explicit mapping may be determined in any suitable manner. For example, in certain embodiments wireless device 110 determines whether to apply an implicit mapping or an explicit mapping based on whether wireless device 110 has received an explicit mapping or not. For example, in some cases if wireless device 110 receives an explicit mapping from network node 115 (or another suitable network entity), then wireless device 110 will apply that explicit mapping. If, however, wireless device 110 does not receive an explicit mapping from network node 115 (or another suitable network entity), then wireless device 110 applies an implicit mapping.

Figure 4:
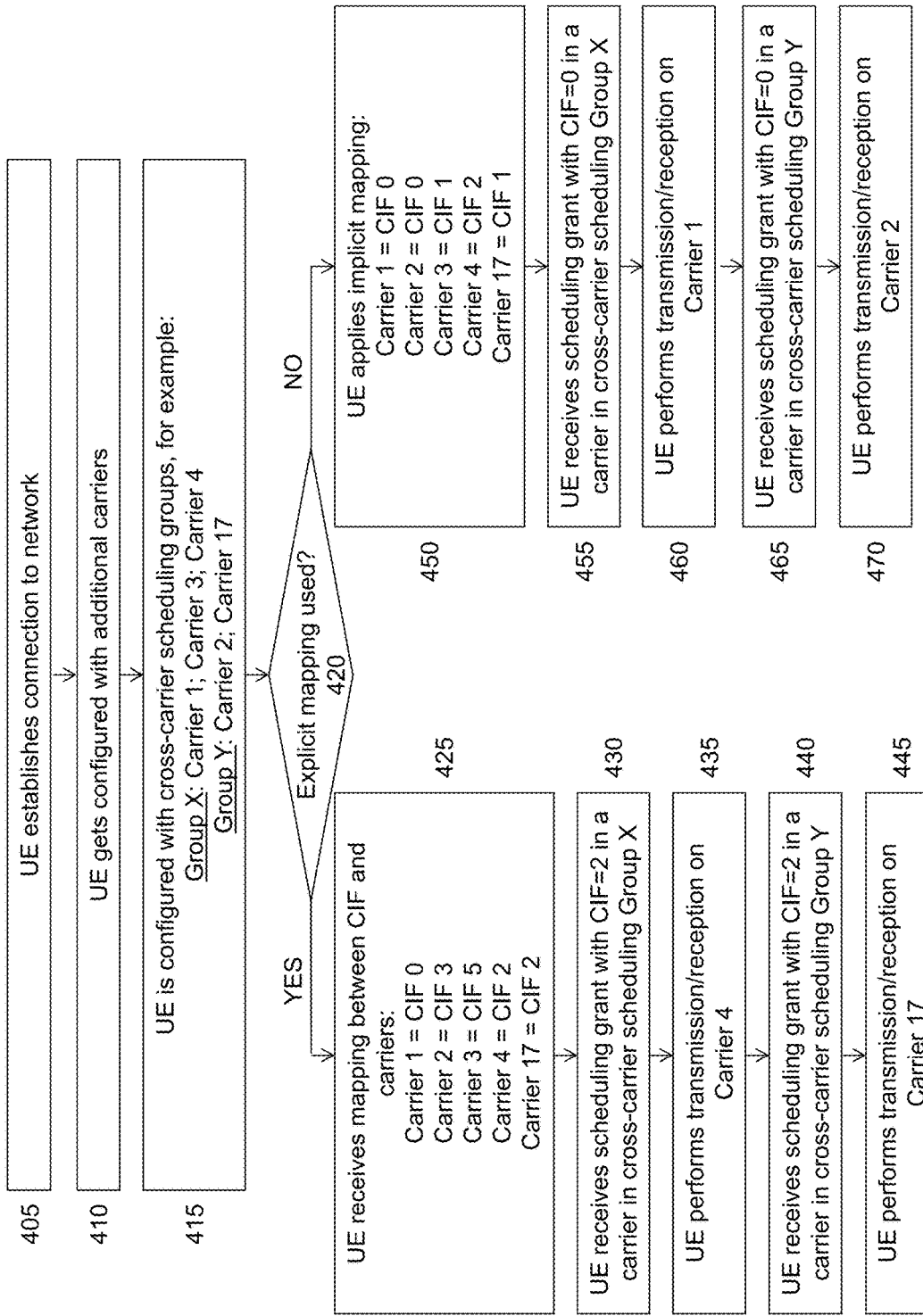
FIG. 4 is a diagram of an event flow for establishing a mapping between carrier indicator field and component carriers, in accordance with certain embodiments.

Thus, using either an explicit or an implicit mapping, wireless device 110 can identify the particular carrier to which the received information relates, and may perform any suitable operations based on the received information. For example, in certain embodiments the received information may be a DL scheduling assignment for the particular carrier. In such a case, when the CIF to cell mapping is established, wireless device 110 can be scheduled on the carriers by network node 115. Network node 115 will indicate a CIF to wireless device 110 on PDCCH, and wireless device 110 will determine which cell is scheduled. This will be done by wireless device 110 determining which serving cell wireless device 110 received the scheduling on (i.e., which cell wireless device 110 received a grant for uplink transmission or a downlink assignment, or in case of device to device communication in LTE, a sidelink grant). Based on this, wireless device 110 knows which group (e.g., cross-carrier scheduling group) wireless device 110 is scheduled in. Which cell within the cross-carrier scheduling group wireless device 110 is scheduled on is known by determining which cell the received CIF is associated with. The flow diagram of FIG. 4 shows an example event flow illustrating some aspects of this disclosure. One of skill in the art will appreciate that these functions, as well as the functions described above, may be carried out through the use of hardware, software modules, or any combination thereof.

Although the various embodiments disclosed herein are described in the context of examples involving fewer than the maximum number of carriers that can be supported by Release 13 of 3GPP, it will be evident to one of skill in the art that the various embodiments disclosed herein could be extended to scenarios involving any suitable number of carriers divided into any suitable number of groups. For example, in a scenario in which all 32 carriers are configured for wireless device 110, network node 115 could divide the configured carriers into four groups (e.g., Groups 1-4) of 8 carriers (corresponding to the number of values that can be supported using the legacy 3-bit CIF value). Using the various embodiments described herein, wireless device 110, upon receiving on a first carrier of one of the four groups information related to a particular carrier in the same group as the first carrier, could identify the particular carrier based on the group to which the first carrier belongs and the CIF value associated with the particular carrier.

FIG. 3 illustrates one way of implementing explicit mapping using RRC signaling, in accordance with certain embodiments. As described above, the mapping between carriers and CIF may be explicitly configured by the network. For example, a network node (such as network node 115 described above, which may for example be an eNB in LTE), may explicitly configure the mapping between carriers and CIF values. In some cases, network node 115 can indicate for each carrier which CIF value a cell is associated with. As described above, a CIF of 3 bits can take 8 values. Network node 115 may communicate, to wireless device 110, the CIF value associated with each of the configured carriers of the first and second groups. In the example of FIG. 3, the added/modified parts relative to the current RRC version (i.e., 3GPP TS 36.331 v 12.5.0) are underlined. Parameter 305 (i.e., cif-Index-r13) indicates the CIF that this serving cell should be associated with.

FIG. 4 is a diagram of an event flow for establishing a mapping between CIF and component carriers, in accordance with certain embodiments. At step 405, the UE establishes a connection to the network. At step 410, the UE is configured with additional carriers. The UE may be configured with additional carriers in any suitable manner and by any suitable network entity. For example, in certain embodiments a network node, such as network node 115 described above in relation to FIG. 2, may configure the UE with additional carriers. Each of the configured carriers may have an associated cell index value.

At step 415, the UE is configured with cross-carrier scheduling groups. The UE may be configured with cross-carrier scheduling groups in any suitable manner and by any suitable network entity. For example, in certain embodiments a network node, such as network node 115 described above in relation to FIG. 2, may configure the UE with cross-carrier scheduling groups. In the example of FIG. 4, the UE is configured with two cross-carrier scheduling groups: cross-carrier scheduling Group X and cross carrier-scheduling Group Y. As shown in FIG. 4, cross-carrier scheduling Group X includes three carriers: Carrier 1; Carrier 3; and Carrier 4. Carrier 1 has a cell index value of 1, Carrier 3 has a cell index value of 3, and Carrier 4 has a cell index value of 4. Cross-carrier scheduling Group Y includes two carriers: Carrier 2 and Carrier 17. Carrier 2 has a cell index value of 2, and Carrier 17 has a cell index value of 17.

At step 420, the UE determines whether explicit mapping is used. As described above with respect to FIG. 2, the mapping between CIF values and serving cells may be explicit or implicit. If the UE determines that explicit mapping is being used, the method proceeds to step 425. At step 425, the UE receives a mapping between CIF values and configured carriers. As described above, the network node may communicate, to the wireless device, the CIF value associated with each of the configured carriers of the first and second groups. In certain embodiments, the network node may communicate information on which carriers are included in each cross-carrier scheduling group. The received mapping associates each of the carriers configured for the UE with a CIF value. In the example of FIG. 4, Carrier 1 is associated with a CIF value of 0, Carrier 2 is associated with a CIF value of 3, Carrier 3 is associated with a CIF value of 5, Carrier 4 is associated with a CIF value of 2, and Carrier 17 is associated with a CIF value of 2.

At step 430, the UE receives a scheduling grant with CIF=2 in a first carrier in cross-carrier scheduling Group X (which includes Carriers 1, 3 and 4). From the received scheduling grant, the UE determines that the first carrier belongs to cross-carrier scheduling Group X. Based on the explicit mapping received from the network node (which associated CIF=2 with Carrier 4 in cross-carrier scheduling Group X and Carrier 17 in cross-carrier scheduling Group Y) and the cross-carrier scheduling group that the carrier on which the scheduling grant was received belongs to (here, cross-carrier scheduling Group X), the UE is able to identify the particular carrier to which the scheduling grant relates using the CIF value. In other words, the UE is able to identify Carrier 4 in cross-carrier scheduling Group X as the particular carrier to which the scheduling grant relates. Thus, at step 435 the UE performs transmission and/or reception on Carrier 4.

As another example, at step 440 the UE receives a scheduling grant with CIF=2 in a carrier in cross-carrier scheduling Group Y. From the received scheduling grant, the UE is able to determine that the first carrier belongs to cross-carrier scheduling Group Y. Based on the explicit mapping received from the network node (which associated CIF=2 with Carrier 4 in cross-carrier scheduling Group X and Carrier 17 in cross-carrier scheduling Group Y), and the cross-carrier scheduling group that the carrier on which the scheduling grant was received belongs to (here, Group Y), the UE is able to identify Carrier 17 in cross-carrier scheduling Group Y as the particular carrier. Thus, at step 445, the UE performs transmission and/or reception on Carrier 17.

If the UE determines at step 420 that an explicit mapping is not used (or, in other words, that an implicit mapping should be used), the method proceeds to step 450. At step 450, the UE applies an implicit mapping. The UE may perform an implicit mapping in any suitable manner. As described above with respect to FIG. 2, in certain embodiments the UE may perform an implicit mapping based at least in part on the cell index value assigned to each carrier. For example, the UE may associate each carrier of the first and second groups (i.e., Group X and Group Y) with one of a plurality of possible CIF values based on the cell index value associated with each carrier. As one example, in the case of implicit mapping the UE may map the carrier having the highest cell index value to the lowest CIF value, and the carrier with the second highest cell index may be mapped to the second lowest CIF value, and so on. In other words, for each of the first and second groups, the UE associates the carrier having a highest numerical cell index value of each of the first and second groups with a lowest numerical CIF value, and associates additional carriers of each of the first and second groups with one of the plurality of possible CIF values such that each additional carrier having a next highest numerical cell index value is associated with a next lowest numerical CIF value.

As another example, and as shown in FIG. 4, in the case of implicit mapping the UE may map the carrier having the lowest cell index value to the lowest CIF value, and the carrier with the second lowest cell index value may be mapped to the second lowest CIF value, and so on. In other words, the UE associates the carrier having a lowest numerical cell index value of each of the first and second groups with a lowest numerical CIF value, and associates additional carriers of each of the first and second groups with one of the plurality of possible CIF values such that each additional carrier having a next lowest numerical cell index value is associated with a next lowest numerical carrier indicator field value. Thus, at step 450, the UE applies an implicit mapping to the configured carriers in Group X and Group Y. Within cross-carrier scheduling Group X (which includes Carrier 1, Carrier 3, and Carrier 4) the UE maps Carrier 1 (the carrier having the lowest numerical cell index value within Group X) to CIF 0. The UE maps Carrier 3 (the carrier having the next lowest numerical cell index value within Group X) to CIF 1. The UE maps Carrier 4 (the carrier having the next lowest numerical cell index value within Group X) to CIF 2. The UE treats the carriers in cross-carrier scheduling Group Y similarly. For example, the UE maps Carrier 2 (the carrier having the lowest numerical cell index value within Group Y) to CIF 0. The UE maps Carrier 17 (the carrier having the next lowest cell index value within Group Y) to CIF 1.

Having applied the implicit mapping at step 450, the method then proceeds to step 455. At step 455, the UE receives a scheduling grant with CIF=0 in a carrier in cross-carrier scheduling Group X. From the received scheduling grant, the UE is able to determine whether the first carrier belongs to the first group of configured carriers (e.g., cross-carrier scheduling Group X) or the second group of configured carriers (e.g., cross-carrier scheduling Group Y). Here, the UE identifies that the scheduling grant was received in a carrier in cross-carrier scheduling Group X. Based on the determined group that the first carrier belongs to and the CIF value associated with the particular carrier (i.e., CIF 0), the UE is able to identify Carrier 1 as the particular carrier in Group X to which the received scheduling grant relates. Thus, at step 460 the UE performs transmission/reception on Carrier 1.

At step 465, the UE receives a scheduling grant with CIF=0 in a carrier in cross-carrier scheduling Group Y. From the received scheduling grant, the UE is able to determine whether the carrier on which the scheduling grant was received belongs to cross-carrier scheduling Group X or cross-carrier scheduling Group Y. Here, the UE identifies that the scheduling grant was received in a carrier in cross-carrier scheduling Group Y. Based on the determined group that the carrier belongs to and the CIF value associated with the particular carrier (i.e., CIF 0), the UE is able to identify Carrier 2 as the carrier in Group Y to which the received scheduling grant relates. Thus, at step 470, the UE performs transmission/reception on Carrier 2.

As described above, in certain embodiments the UE may receive information other than a scheduling grant. For example, the UE may receive, from the network node on a first carrier of either the first group of configured carriers (e.g., Group X) or a second group of configured carriers (e.g., Group Y), any suitable information related to a particular carrier in the same group as the first carrier. In some cases, the information may be one or more of a DL scheduling assignment for the particular carrier; an UL scheduling grant for the particular carrier; a sidelink grant for the particular carrier; and an order to perform contention free random access on the particular carrier. After applying the mapping (whether received explicitly or performed implicitly by the UE), the UE can use the CIF value associated with the particular carrier to identify the particular carrier to which the received information relates.

Figure 5:
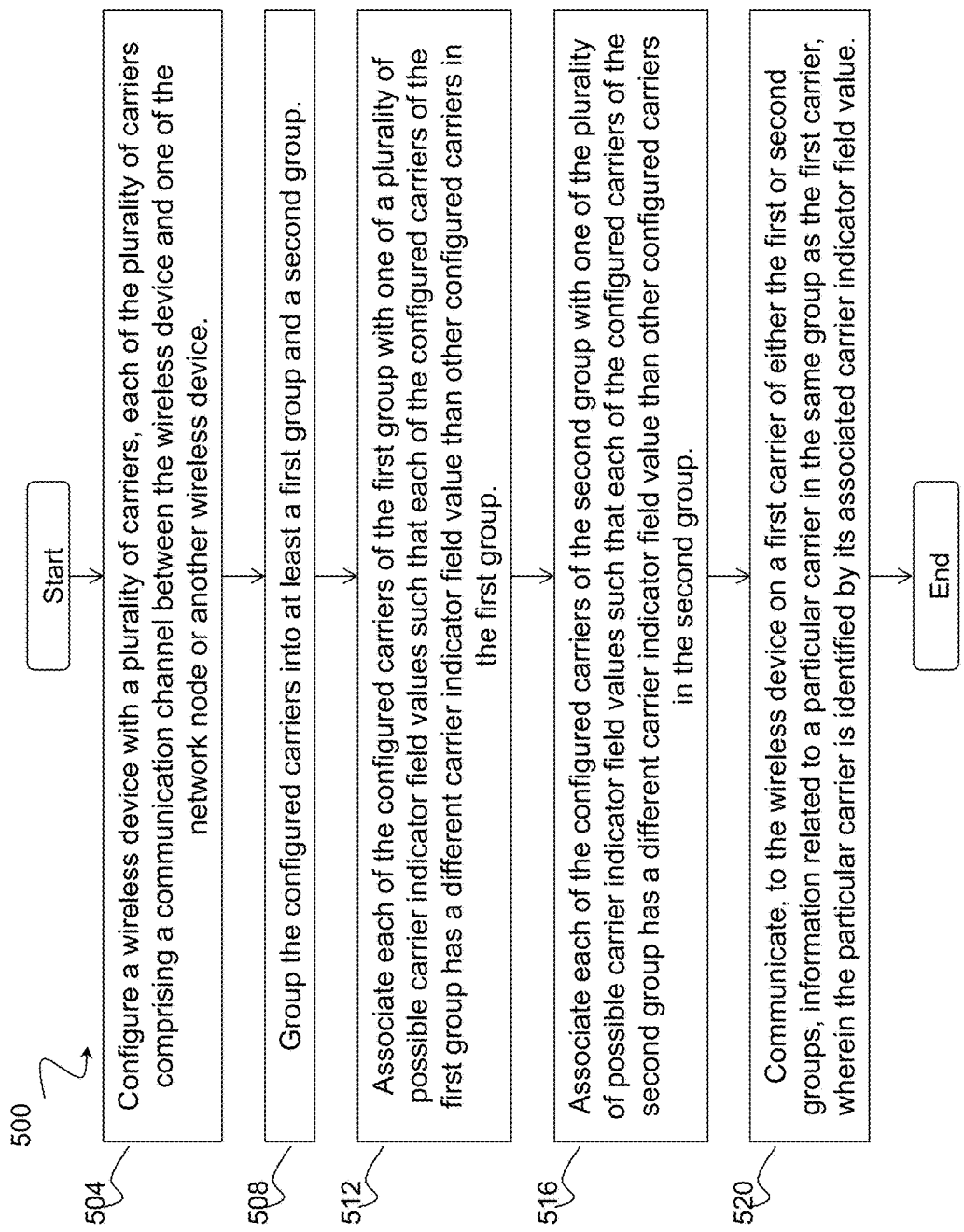
FIG. 5 is a flow diagram of a method in a network node, in accordance with certain embodiments.

FIG. 5 is a flow diagram of a method in a network node, in accordance with certain embodiments. The method begins at step 504, where the network node configures a wireless device with a plurality of carriers, each of the plurality of carriers comprising a communication channel between the wireless device and one of the network node or another wireless device. At step 508, the network node groups the configured carriers into at least a first group and a second group.

At step 512, the network node associates each of the configured carriers of the first group with one of a plurality of possible carrier indicator field values such that each of the configured carriers of the first group has a different carrier indicator field value than other configured carriers in the first group. At step 516, the network node associates each of the configured carriers of the second group with one of the plurality of possible carrier indicator field values such that each of the configured carriers of the second group has a different carrier indicator field value than other configured carriers in the second group.

At step 520, the network node communicates, to the wireless device on a first carrier of either the first or second groups, information related to a particular carrier in the same group as the first carrier, wherein the particular carrier is identified by its associated carrier indicator field value. In certain embodiments, the information may comprise one or more of: a downlink scheduling assignment for the particular carrier; an uplink scheduling grant for the particular carrier; a sidelink grant for the particular carrier; and an order to perform contention free random access on the particular carrier.

In certain embodiments, the method may comprise communicating, to the wireless device, the carrier indicator field value associated with each of the configured carriers of the first and second groups. The carrier indicator field value associated with each of the configured carriers of the first and second groups may be communicated in any suitable manner. As one example, the carrier indicator field value associated with each of the configured carriers of the first and second groups may be communicated via radio resource control signaling. In certain embodiments, the method may comprise communicating, to the wireless device, information indicating which of the configured carriers belong to the first group and which of the configured carriers belong to the second group, the communicated information further comprising the carrier indicator field value associated with each of the configured carriers of the first and second groups.

In certain embodiments, at least one of the configured carriers may be associated with a particular one of the plurality of possible carrier indicator field values based on one or more characteristics of the at least one carrier. The one or more characteristics may comprise one or more of: whether the at least one carrier is configured with a physical uplink control channel; and whether the at least one carrier is a scheduling cell.

In certain embodiments, the method may comprise associating each of the configured carriers of the first group with one of a plurality of possible cell index values, and associating each of the configured carriers of the second group with one of the plurality of possible cell index values. The method may comprise configuring the wireless device to identify a carrier indicator field value for the particular carrier based on the cell index value of the particular carrier.

Figure 6:
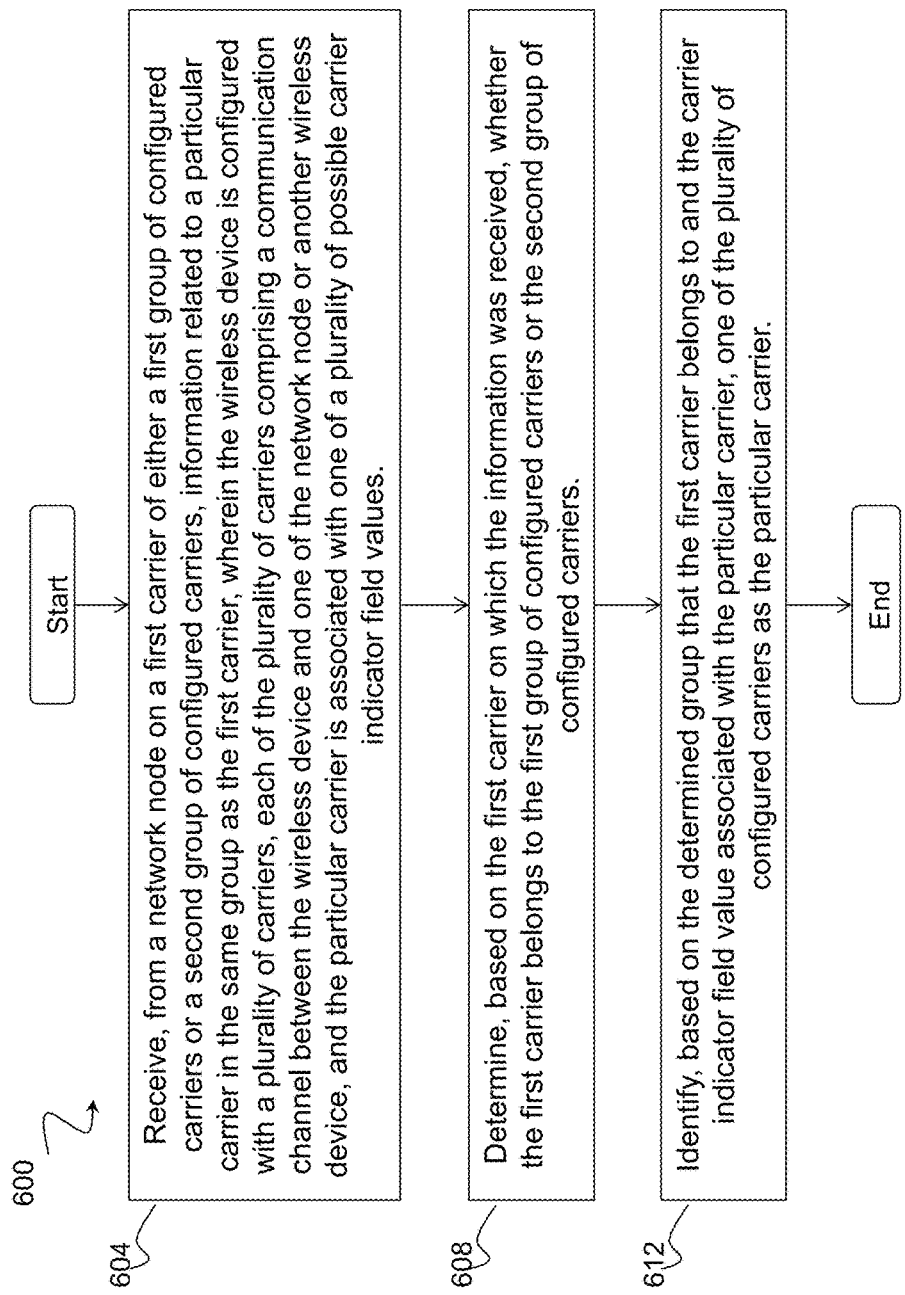
FIG. 6 is a flow diagram of a method in a wireless device, in accordance with certain embodiments.

FIG. 6 is a flow diagram of a method in a wireless device, in accordance with certain embodiments. The method begins at step 604, where the wireless device receives, from a network node on a first carrier of either a first group of configured carriers or a second group of configured carriers, information related to a particular carrier in the same group as the first carrier, wherein the wireless device is configured with a plurality of carriers, each of the plurality of carriers comprising a communication channel between the wireless device and one of the network node or another wireless device, and the particular carrier is associated with one of a plurality of possible carrier indicator field values. In certain embodiments, the information may comprise one or more of: a downlink scheduling assignment for the particular carrier; an uplink scheduling grant for the particular carrier; a sidelink grant for the particular carrier; and an order to perform contention free random access on the particular carrier.

At step 608, the wireless device determines, based on the first carrier on which the information was received, whether the first carrier belongs to the first group of configured carriers or the second group of configured carriers.

At step 612, the wireless device identifies, based on the determined group that the first carrier belongs to and the carrier indicator field value associated with the particular carrier, one of the plurality of configured carriers as the particular carrier. In certain embodiments, the method may comprise receiving, from the network node, information indicating which one of a plurality of possible carrier indicator field values is associated with each of the configured carriers of the first and second groups, and identifying one of the plurality of carriers as the particular carrier may be based on the received information. The information indicating which one of the plurality of possible carrier indicator field values is associated with each of the configured carriers of the first and second groups may be received in any suitable manner. For example, in certain embodiments the carrier indicator field value associated with each of the configured carriers of the first and second groups may be received via radio resource control signaling. In certain embodiments, the method comprises receiving, from the network node, information indicating which of the plurality of configured carriers belong to the first group and which of the configured carriers belong to the second group, the received information further comprising the carrier indicator field value associated with each of the configured carriers of the first and second groups, and identifying one of the plurality of carriers as the particular carrier may be based on the received information.

In certain embodiments, each of the configured carriers of the first and second groups may be associated with one of a plurality of possible cell index values. The method may comprise associating each carrier of the first and second groups with one of a plurality of possible carrier indicator field values based on the cell index value associated with each carrier, and identifying one of the plurality of configured carriers as the particular carrier may be based on the cell indicator field value associated with each carrier based on the cell index value. In certain embodiments, associating each carrier of the first and second groups with one of the plurality of possible carrier indicator field values based on the cell index value associated with each carrier may comprise associating a carrier having a lowest numerical cell index value of each of the first and second groups with a lowest numerical carrier indicator field value, and associating additional carriers of each of the first and second groups with one of the plurality of possible cell indicator field values such that each additional carrier having a next lowest numerical cell index value is associated with a next lowest numerical carrier indicator field value. In certain embodiments, associating each carrier of the first and second groups with one of the plurality of possible carrier indicator field values based on the cell index value associated with each carrier may comprise associating a carrier having a highest numerical cell index value of each of the first and second groups with a lowest numerical carrier indicator field value, and associating additional carriers of each of the first and second groups with one of the plurality of possible cell indicator field values such that each additional carrier having a next highest numerical cell index value is associated with a next lowest numerical carrier indicator field value.

Figure 7:
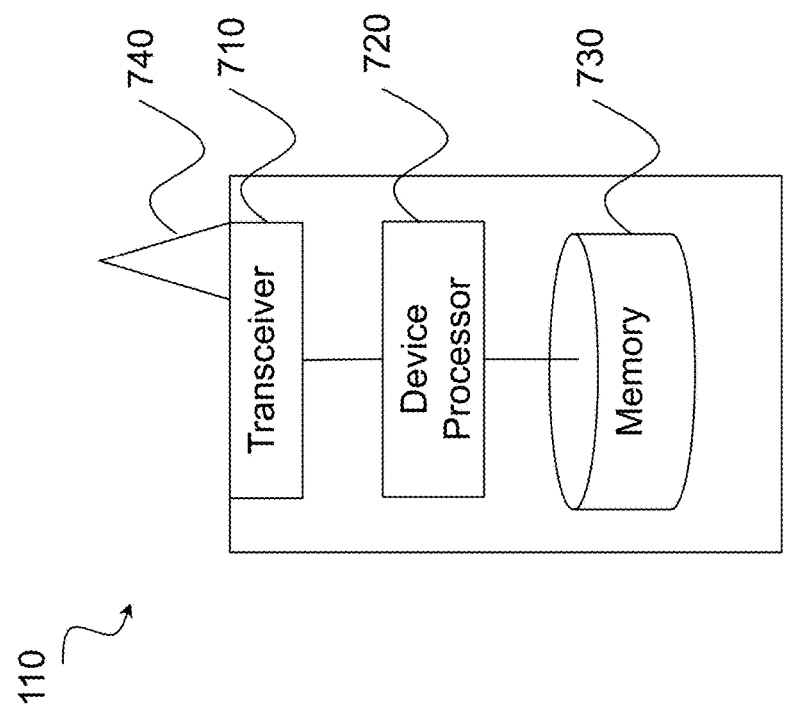
FIG. 7 is a block schematic of an exemplary wireless device, in accordance with certain embodiments.

FIG. 7 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via antenna 740), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110, such as the functions of wireless device 110 described above in relation to FIGS. 1-6. In some embodiments, processor 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 720.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 720. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
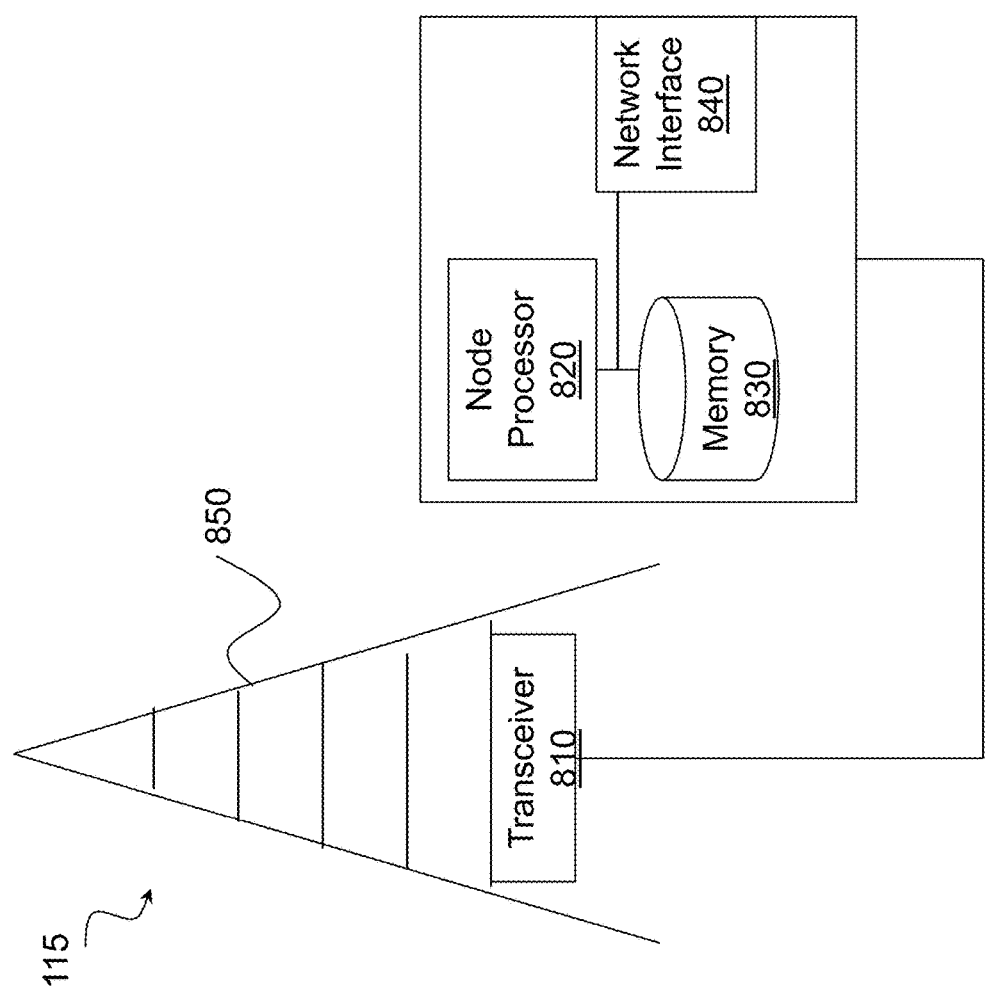
FIG. 8 is a block schematic of an exemplary network node, in accordance with certain embodiments.

FIG. 8 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via antenna 850), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes or radio network controllers 130, etc.

Processor 820 may include any suitable combination of hardware and software implemented in one or more modules to execute instructions and manipulate data to perform some or all of the described functions of network node 115, such as those described above in relation to FIGS. 1-6 above. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
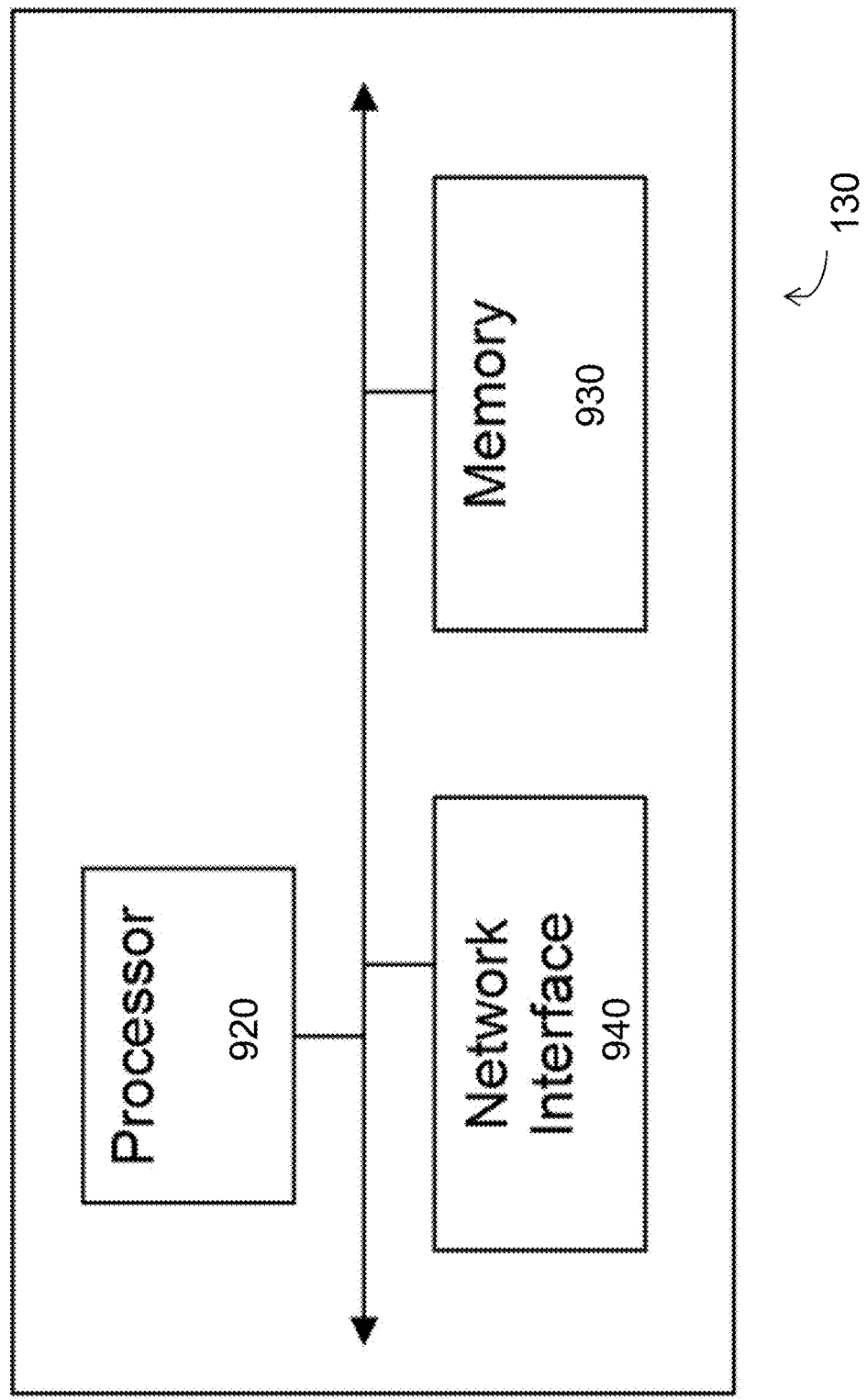
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 130, etc.

Processor 920 may include any suitable combination of hardware and software implemented in one or more modules to execute instructions and manipulate data to perform some or all of the described functions of the radio network controller or core network node 130. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
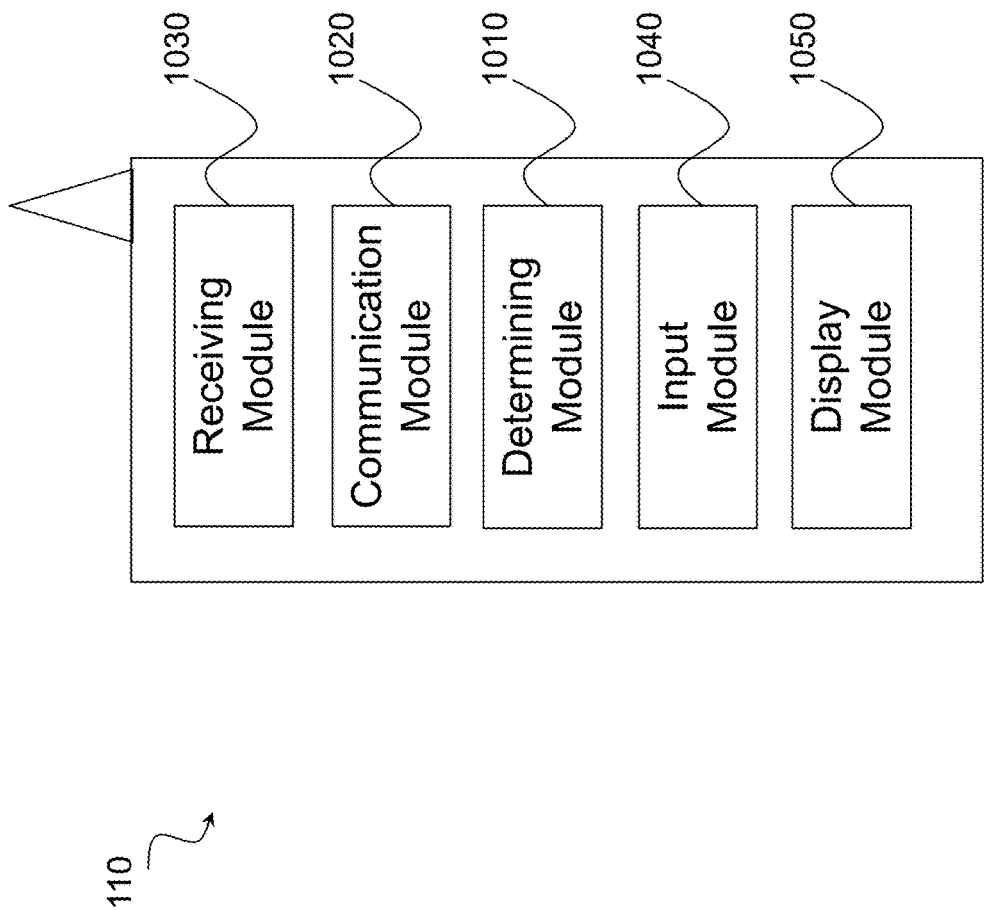
FIG. 10 is a block schematic of an exemplary wireless device, in accordance with certain embodiments.

FIG. 10 is a block schematic of an exemplary wireless device, in accordance with certain embodiments. Wireless device 110 may include one or more modules. For example, wireless device 110 may include a determining module 1010, a communication module 1020, a receiving module 1030, an input module 1040, a display module 1050, and any other suitable modules. Wireless device 110 may perform the methods for mapping CIF and serving cells described above with respect to FIGS. 1-6.

Determining module 1010 may perform the processing functions of wireless device 110. For example, determining module 1010 may determine, based on the first carrier on which the information was received, whether the first carrier belongs to the first group of configured carriers or the second group of configured carriers. As another example, determining module 1010 may identify, based on the determined group that the first carrier belongs to and the carrier indicator field value associated with the particular carrier, one of the plurality of configured carriers as the particular carrier. As still another example, determining module 1010 may associate each carrier of the first and second groups with one of a plurality of possible carrier indicator field values based on the cell index value associated with each carrier. As yet another example, determining module 1010 may associate a carrier having a lowest numerical cell index value of each of the first and second groups with a lowest numerical carrier indicator field value, and associate additional carriers of each of the first and second groups with one of the plurality of possible cell indicator field values such that each additional carrier having a next lowest numerical cell index value is associated with a next lowest numerical carrier indicator field value. As another example, determining module 1010 may associate a carrier having a highest numerical cell index value of each of the first and second groups with a lowest numerical carrier indicator field value, and associate additional carriers of each of the first and second groups with one of the plurality of possible cell indicator field values such that each additional carrier having a next highest numerical cell index value is associated with a next lowest numerical carrier indicator field value.

Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 described above may, in certain embodiments, be performed in one or more distinct modules.

Communication module 1020 may perform the transmission functions of wireless device 110. Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010. In certain embodiments, the functions of communication module 1020 described above may be performed in one or more distinct modules.

Receiving module 1030 may perform the receiving functions of wireless device 110. As one example, receiving module 1030 may receive, from a network node on a first carrier of either a first group of configured carriers or a second group of configured carriers, information related to a particular carrier in the same group as the first carrier, wherein the wireless device is configured with a plurality of carriers, each of the plurality of carriers comprising a communication channel between the wireless device and one of the network node or another wireless device, and the particular carrier is associated with one of a plurality of possible carrier indicator field values. As another example, receiving module 1030 may receive, from the network node, information indicating which one of a plurality of possible carrier indicator field values is associated with each of the configured carriers of the first and second groups. As still another example, receiving module 1030 may receive, from the network node, information indicating which of the plurality of configured carriers belong to the first group and which of the configured carriers belong to the second group, the received information further comprising the carrier indicator field value associated with each of the configured carriers of the first and second groups. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

FIG. 11 is a block schematic of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processor 820 described above in relation to FIG. 8. In certain embodiments, the functions of two or more of the various modules may be combined into a single module. Network node 115 may perform the methods for mapping CIF and serving cells described above with respect to FIGS. 1-6.

Determining module 1110 may perform the processing functions of network node 115. As one example, determining module 1110 may configure a wireless device with a plurality of carriers, each of the plurality of carriers comprising a communication channel between the wireless device and one of the network node or another wireless device. As another example, determining module 1110 may group the configured carriers into at least a first group and a second group. As still another example, determining module 1110 may associate each of the configured carriers of the first group with one of a plurality of possible carrier indicator field values such that each of the configured carriers of the first group has a different carrier indicator field value than other configured carriers in the first group. As yet another example, determining module 1110 may associate each of the configured carriers of the second group with one of the plurality of possible carrier indicator field values such that each of the configured carriers of the second group has a different carrier indicator field value than other configured carriers in the second group. As another example, determining module 1110 may associate each of the configured carriers of the first group with one of a plurality of possible cell index values, and associate each of the configured carriers of the second group with one of the plurality of possible cell index values. As another example, determining module 1110 may configure the wireless device to identify a carrier indicator field value for the particular carrier based on the cell index value of the particular carrier. As another example, determining module 1110 may associate at least one of the configured carriers with a particular one of the plurality of possible carrier indicator field values based on one or more characteristics of the at least one carrier.

Determining module 1110 may include or be included in one or more processors, such as processor 820 described above in relation to FIG. 8. Determining module 1110 may include analog and/or digital circuitry configured to perform any of the functions of determining module 1110 and/or processor 820 described above. The functions of determining module 1110 may, in certain embodiments, be performed in one or more distinct modules. For example, in certain embodiments some of the functionality of determining module 1110 may be performed by an allocation module.

Communication module 1120 may perform the transmission functions of network node 115. As one example, communication module 1120 may communicate, to the wireless device on a first carrier of either the first or second groups, information related to a particular carrier in the same group as the first carrier, wherein the particular carrier is identified by its associated carrier indicator field value. As another example, communication module 1120 may communicate, to the wireless device, the carrier indicator field value associated with each of the configured carriers of the first and second groups. As still another example, communication module 1120 may communicate, to the wireless device, information indicating which of the configured carriers belong to the first group and which of the configured carriers belong to the second group, the communicated information further comprising the carrier indicator field value associated with each of the configured carriers of the first and second groups. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. Receiving module 1130 may receive any suitable information from a wireless device. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
BS Base Station
BSC Base Station Controller
BTS Base Transceiver Station
CA Carrier Aggregation
CBRA Contention Based Random Access
CC Component Carrier
CIF Carrier Indicator Field
CFRA Contention Free Random Access
CPE Customer Premises Equipment
D2D Device-to-device
DAS Distributed Antenna System
DL Downlink
eNB evolved Node B
FDD Frequency Division Duplex
LAA License Assisted Access
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MSR Multi-standard Radio
NAS Non-Access Stratum
PCell Primary Carrier
PDCCH Physical Downlink Control Channel
PDSCH Physical Downlink Shared Channel
PSTN Public Switched Telephone Network
PUSCH Physical Uplink Shared Channel
PUCCH Physical Uplink Control Channel
RNC Radio Network Controller
RRC Radio Resource Control
RRH Remote Radio Head
RRU Remote Radio Unit
SCell Secondary Carrier
TDD Time Division Duplex
UCI Uplink Control Information
UE User Equipment
UL Uplink
WAN Wide Area Network

The invention claimed is:

1. A method in a network node, comprising:
configuring a wireless device with a plurality of carriers, each of the plurality of carriers comprising a communication channel between the wireless device and one of the network node or another wireless device;
grouping the configured carriers into at least a first group and a second group;
associating each of the configured carriers of the first group with one of a plurality of possible carrier indicator field values such that each of the configured carriers of the first group has a different carrier indicator field value than other configured carriers in the first group;
associating each of the configured carriers of the second group with one of the plurality of possible carrier indicator field values such that each of the configured carriers of the second group has a different carrier indicator field value than other configured carriers in the second group;
communicating, to the wireless device on a first carrier of either the first or second groups, information related to a particular carrier in the same group as the first carrier, wherein the particular carrier is identified by its associated carrier indicator field value;
associating each of the configured carriers of the first group with one of a plurality of possible cell index values;
associating each of the configured carriers of the second group with one of the plurality of possible cell index values;
configuring the wireless device to associate each carrier of the first and second groups with one of a plurality of possible carrier indicator field values based on the cell index value associated with each carrier, the associating comprising:
associating a carrier having a lowest numerical cell index value of each of the first and second groups with a lowest numerical carrier indicator field value; and
associating additional carriers of each of the first and second groups with one of the plurality of possible cell indicator field values such that each additional carrier having a next lowest numerical cell index value is associated with a next lowest numerical carrier indicator field value; and
configuring the wireless device to identify one of the plurality of configured carriers as the particular carrier based on the cell indicator field value associated with each carrier based on the cell index value.

2. The method of claim 1, wherein the information comprises one or more of:
a downlink scheduling assignment for the particular carrier;
an uplink scheduling grant for the particular carrier;
a sidelink grant for the particular carrier; and
an order to perform contention free random access on the particular carrier.

3. The method of claim 1, comprising communicating, to the wireless device, the carrier indicator field value associated with each of the configured carriers of the first and second groups.

4. The method of claim 3, wherein the carrier indicator field value associated with each of the configured carriers of the first and second groups is communicated via radio resource control signaling.

5. The method of claim 1, comprising communicating, to the wireless device, information indicating which of the configured carriers belong to the first group and which of the configured carriers belong to the second group, the communicated information further comprising the carrier indicator field value associated with each of the configured carriers of the first and second groups.

6. The method of claim 1, wherein at least one of the configured carriers is associated with a particular one of the plurality of possible carrier indicator field values based on one or more characteristics of the at least one carrier.

7. The method of claim 6, wherein the one or more characteristics comprise one or more of:
whether the at least one carrier is configured with a physical uplink control channel; and
whether the at least one carrier is a scheduling cell.

8. A method in a wireless device, the method comprising:
receiving, from a network node on a first carrier of either a first group of configured carriers or a second group of configured carriers, information related to a particular carrier in the same group as the first carrier, wherein the wireless device is configured with a plurality of carriers, each of the plurality of carriers comprising a communication channel between the wireless device and one of the network node or another wireless device, and the particular carrier is associated with one of a plurality of possible carrier indicator field values;
determining, based on the first carrier on which the information was received, whether the first carrier belongs to the first group of configured carriers or the second group of configured carriers; and
identifying, based on the determined group that the first carrier belongs to and the carrier indicator field value associated with the particular carrier, one of the plurality of configured carriers as the particular carrier;
wherein each of the configured carriers of the first and second groups is associated with one of a plurality of possible cell index values, and the method further comprises:
associating each carrier of the first and second groups with one of a plurality of possible carrier indicator field values based on the cell index value associated with each carrier, the associating comprising:
associating a carrier having a lowest numerical cell index value of each of the first and second groups with a lowest numerical carrier indicator field value; and
associating additional carriers of each of the first and second groups with one of the plurality of possible cell indicator field values such that each additional carrier having a next lowest numerical cell index value is associated with a next lowest numerical carrier indicator field value; and
wherein identifying one of the plurality of configured carriers as the particular carrier is based on the cell indicator field value associated with each carrier based on the cell index value.

9. The method of claim 8, wherein the information comprises one or more of:
a downlink scheduling assignment for the particular carrier;
an uplink scheduling grant for the particular carrier;
a sidelink grant for the particular carrier; and
an order to perform contention free random access on the particular carrier.

10. The method of claim 8, comprising:
receiving, from the network node, information indicating which one of a plurality of possible carrier indicator field values is associated with each of the configured carriers of the first and second groups; and
wherein identifying one of the plurality of carriers as the particular carrier is based on the received information.

11. The method of claim 10, wherein the carrier indicator field value associated with each of the configured carriers of the first and second groups is received via radio resource control signaling.

12. The method of claim 8, comprising:
receiving, from the network node, information indicating which of the plurality of configured carriers belong to the first group and which of the configured carriers belong to the second group, the received information further comprising the carrier indicator field value associated with each of the configured carriers of the first and second groups; and
wherein identifying one of the plurality of carriers as the particular carrier is based on the received information.

13. The method of claim 8, wherein associating each carrier of the first and second groups with one of the plurality of possible carrier indicator field values based on the cell index value associated with each carrier comprises:
associating a carrier having a highest numerical cell index value of each of the first and second groups with a lowest numerical carrier indicator field value; and
associating additional carriers of each of the first and second groups with one of the plurality of possible cell indicator field values such that each additional carrier having a next highest numerical cell index value is associated with a next lowest numerical carrier indicator field value.

14. A network node, comprising:
one or more processors, the one or more processors configured to:
configure a wireless device with a plurality of carriers, each of the plurality of carriers comprising a communication channel between the wireless device and one of the network node or another wireless device;
group the configured carriers into at least a first group and a second group;
associate each of the configured carriers of the first group with one of a plurality of possible carrier indicator field values such that each of the configured carriers of the first group has a different carrier indicator field value than other configured carriers in the first group;
associate each of the configured carriers of the second group with one of the plurality of possible carrier indicator field values such that each of the configured carriers of the second group has a different carrier indicator field value than other configured carriers in the second group;
communicate, to the wireless device on a first carrier of either the first or second groups, information related to a particular carrier in the same group as the first carrier, wherein the particular carrier is identified by its associated carrier indicator field value;
associate each of the configured carriers of the first group with one of a plurality of possible cell index values;
associate each of the configured carriers of the second group with one of the plurality of possible cell index values;
configure the wireless device to associate each carrier of the first and second groups with one of a plurality of possible carrier indicator field values based on the cell index value associated with each carrier, the associating comprising:
associating a carrier having a lowest numerical cell index value of each of the first and second groups with a lowest numerical carrier indicator field value; and
associating additional carriers of each of the first and second groups with one of the plurality of possible cell indicator field values such that each additional carrier having a next lowest numerical cell index value is associated with a next lowest numerical carrier indicator field value; and
configure the wireless device to identify one of the plurality of configured carriers as the particular carrier based on the cell indicator field value associated with each carrier based on the cell index value.

15. The network node of claim 14, wherein the information comprises one or more of:
   a downlink scheduling assignment for the particular carrier;
   an uplink scheduling grant for the particular carrier;
   a sidelink grant for the particular carrier; and
   an order to perform contention free random access on the particular carrier.

16. The network node of claim 14, wherein the one or more processors are configured to communicate, to the wireless device, the carrier indicator field value associated with each of the configured carriers of the first and second groups.

17. The network node of claim 16, wherein the one or more processors are configured to communicate the carrier indicator field value associated with each of the configured carriers of the first and second groups via radio resource control signaling.

18. The network node of claim 14, wherein the one or more processors are configured to communicate, to the wireless device, information indicating which of the configured carriers belong to the first group and which of the configured carriers belong to the second group, the communicated information further comprising the carrier indicator field value associated with each of the configured carriers of the first and second groups.

19. The network node of claim 14, wherein at least one of the configured carriers is associated with a particular one of the plurality of possible carrier indicator field values based on one or more characteristics of the at least one carrier.

20. The network node of claim 19, wherein the one or more characteristics comprise one or more of:
   whether the at least one carrier is configured with a physical uplink control channel; and
   whether the at least one carrier is a scheduling cell.

21. A wireless device, comprising:
   one or more processors, the one or more processors configured to:
      receive, from a network node on a first carrier of either a first group of configured carriers or a second group of configured carriers, information related to a particular carrier in the same group as the first carrier, wherein the wireless device is configured with a plurality of carriers, each of the plurality of carriers comprising a communication channel between the wireless device and one of the network node or another wireless device, and the particular carrier is associated with one of a plurality of possible carrier indicator field values;
      determine, based on the first carrier on which the information was received, whether the first carrier belongs to the first group of configured carriers or the second group of configured carriers; and
      identify, based on the determined group that the first carrier belongs to and the carrier indicator field value associated with the particular carrier, one of the plurality of configured carriers as the particular carrier;
   wherein each of the configured carriers of the first and second groups are associated with one of a plurality of possible cell index values, and the one or more processors are further configured to:
      associate each carrier of the first and second groups with one of a plurality of possible carrier indicator field values based on the cell index value associated with each carrier, the associating comprising:
         associating a carrier having a lowest numerical cell index value of each of the first and second groups with a lowest numerical carrier indicator field value; and
         associating additional carriers of each of the first and second groups with one of the plurality of possible cell indicator field values such that each additional carrier having a next lowest numerical cell index value is associated with a next lowest numerical carrier indicator field value; and
   wherein the one or more processors are further configured to identify one of the plurality of configured carriers as the particular carrier based on the cell indicator field value associated with each carrier based on the cell index value.

22. The wireless device of claim 21, wherein the information comprises one or more of:
   a downlink scheduling assignment for the particular carrier;
   an uplink scheduling grant for the particular carrier;
   a sidelink grant for the particular carrier; and
   an order to perform contention free random access on the particular carrier.

23. The wireless device of claim 21, wherein the one or more processors are configured to:
   receive, from the network node, information indicating which one of a plurality of possible carrier indicator field values is associated with each of the configured carriers of the first and second groups; and
   wherein the one or more processors configured to identify one of the plurality of carriers as the particular carrier comprise one or more processors configured to identify one of the plurality of carriers as the particular carrier based on the received information.

24. The wireless device of claim 23, wherein the one or more processors are configured to receive the carrier indicator field value associated with each of the configured carriers of the first and second groups via radio resource control signaling.

25. The wireless device of claim 21, wherein the one or more processors are configured to:
   receive, from the network node, information indicating which of the plurality of configured carriers belong to the first group and which of the configured carriers belong to the second group, the received information further comprising the carrier indicator field value associated with each of the configured carriers of the first and second groups; and
   wherein the one or more processors configured to identify one of the plurality of carriers as the particular carrier comprise one or more processors configured to identify one of the plurality of carriers as the particular carrier based on the received information.

26. The wireless device of claim 21, wherein the one or more processors configured to associate each carrier of the first and second groups with one of the plurality of possible carrier indicator field values based on the cell index value associated with each carrier comprise one or more processors configured to:
   associate a carrier having a highest numerical cell index value of each of the first and second groups with a lowest numerical carrier indicator field value; and
   associate additional carriers of each of the first and second groups with one of the plurality of possible cell indicator field values such that each additional carrier having a next highest numerical cell index value is associated with a next lowest numerical carrier indicator field value.

* * * * *